Patented May 27, 1947

2,421,208

UNITED STATES PATENT OFFICE 2,421,208

METHOD OF APPLYING PHOSPHOR MATERIAL TO A SUPPORT MEMBER

Humboldt W. Leverenz, Princeton, N. J., assignor to Radio Corporation of America, a corporation of Delaware No Drawing. Application May 5, 1945, Serial No. 592,287

2 Claims. (Cl. 117—33.5)

This invention relates to a method of applying phosphor material to a target base or analogous device. More particularly, it relates to the settling of water-sensitive pulverulent phosphor material through non-aqueous liquids containing a binding material in solution.

Phosphor materials customarily used in television tubes are not deleteriously affected by water and they may be settled onto the target or screen from suspension in water or a water solution, as described in my Patent 2,108,683.

The fluorides of zinc and magnesium, when excited by a cathode beam, X-rays, light or other energy, have a decay period relatively long in comparison with the usual phosphor of a television tube. After the exciting source has been removed, these particular fluorides emit strong light for a period as long as a half second or even longer and then rather suddenly blank out to invisibility. They therefore may be advantageously used in systems having relatively low scanning rate and particularly in radar systems, which are of great importance in war. Such phosphors are described in the application of Maggio Banca filed April 19, 1945, Serial No. 589,269, owned by the assignee of this invention.

The fluorides of zinc and magnesium are deleteriously affected by water and cannot be settled therefrom. It is an object of this invention to provide a novel method of applying these and other moisture-sensitive phosphors to screens or targets of cathode beam tubes.

Another object of this invention is to settle a pulverulent phosphor material from an organic liquid containing an inorganic solute capable of binding the particles when the liquid is evaporated.

Another object is to settle a phosphor material on a target base from an organic solvent containing magnesium sulphate.

Other objects will appear in the following specification.

The fluoride phosphor product, or other water-sensitive material, is applied to the target or screen end of a cathode beam tube in the following manner:

A suitable inorganic salt, magnesium sulphate for example, is dissolved substantially to the saturation point in an organic solvent such as ethyl or other alcohol. The powdered phosphor material of, say, $ZnF_2$:Mn is suspended in this solution by stirring or otherwise and the resulting liquid mixture is poured into the glass container that is to constitute the evacuated envelope of the cathode beam tube, with the target end of the tube at the bottom.

The suspended particles of zinc fluoride and manganese activator sink slowly through the organic liquid and are deposited on the target end of the container. These particles of the phosphor deposit are, of course, surrounded by the alcohol and dissolved magnesium sulphate.

When the deposit has settled to the desired thickness, the supernatant liquid is removed by siphoning or otherwise.

The layer of phosphor sediment is then dried on the end of the tube, preferably by passing clean dry air over it. The magnesium sulphate, however, remains and acts as a binder to promote adhesion of the phosphor particles to each other and to the target end of the glass container. The gun and other elements can then be applied and the tube finished in a way well known in the art.

Instead of using ethyl alcohol, I may use other alcohols such as methyl, propyl, etc., and other organic liquids such as ether and glycerine (diluted). Instead of magnesium sulphate, I may use magnesium chloride or bromate or other solutes such as beryllium chloride, fluoride or bromide, with which I may use an organic solvent of alcohol, ether or benzene ($C_6H_6$). The desideratum is to use an organic suspension liquid in which an inorganic salt or compound is sufficiently soluble to deposit enough of the compound with the phosphor upon drying to provide a binder and which organic compound does not break down or volatilize during the process of completing or using the tube in which it is used.

When the zinc fluoride phosphor is settled onto the support through an organic liquid, it is deposited in place without being deleteriously affected, which is not the case if settled through an aqueous solution, and the particles are held in place by the magnesium sulphate or other suitable solute.

While the improved method has been described in connection with a phosphor of zinc fluoride, it is intended for use with others, for example the fluorides of cadmium and magnesium either alone or co-crystallized with zinc fluoride in the desired proportion. It also may be used with any other water-sensitive phosphor material.

Having described my invention, what I claim is:

1. The method of applying a fluoride phosphor to a base, which comprises suspending above the base fine particles of the fluoride in a saturated solution of magnesium sulphate in alcohol, removing the supernatant alcohol after the phosphor particles have settled onto said base and evaporating the remaining alcohol to cause the magnesium sulphate to bind the phosphor particles together and to said base.

2. The method of applying a zinc fluoride phosphor to a base, which comprises suspending above the base fine particles of zinc fluoride in a saturated solution of magnesium sulphate in alcohol, removing the supernatant alcohol after the zinc fluoride particles have settled onto said base and evaporating the remainder of the alcohol to cause the magnesium sulphate to bind the zinc fluoride particles together and to said base.

HUMBOLDT W. LEVERENZ.

REFERENCES CITED

The following references are of record in the file of this patent:

UNITED STATES PATENTS

| Number | Name | Date |
| --- | --- | --- |
| 2,227,305 | Grossman | Dec. 31, 1940 |
| 2,161,458 | Bocr et al. | June 6, 1939 |
| 2,062,858 | Batchelor | Dec. 1, 1936 |
| 1,645,599 | Jones | Oct. 18, 1927 |